US012789736B2

(12) United States Patent
Kwon et al.

(10) Patent No.: US 12,789,736 B2
(45) Date of Patent: Nov. 10, 2026

(54) BUMPER STRUCTURE FOR MOUNTING RADAR UNIT

(71) Applicants: Hyundai Motor Company, Seoul (KR); Kia Corporation, Seoul (KR)

(72) Inventors: Woo Jae Kwon, Suwon-si (KR); Seung Jin Lee, Hwaseong-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 264 days.

(21) Appl. No.: 18/646,139

(22) Filed: Apr. 25, 2024

(65) Prior Publication Data

US 2025/0100493 A1 Mar. 27, 2025

(30) Foreign Application Priority Data

Sep. 27, 2023 (KR) ........................ 10-2023-0129942

(51) Int. Cl.
*B60R 19/48* (2006.01)
*G01S 13/931* (2020.01)

(52) U.S. Cl.
CPC .. *B60R 19/483* (2013.01); *G01S 2013/93275* (2020.01)

(58) Field of Classification Search
CPC .................... B60R 19/483; G01S 2013/93275
See application file for complete search history.

(56) References Cited

U.S. PATENT DOCUMENTS

| | | | | |
|---|---|---|---|---|
| 10,024,970 B2 * | 7/2018 | Hoffman, Jr. | B60R 13/04 | |
| 10,399,522 B2 * | 9/2019 | Kaminade | B60R 19/50 | |
| 11,130,459 B2 * | 9/2021 | Kumashiro | B60R 19/03 | |
| 11,292,410 B2 * | 4/2022 | Keysberg | G01S 13/931 | |
| 11,458,917 B2 * | 10/2022 | Umeki | B60R 11/00 | |
| 12,246,652 B2 * | 3/2025 | Nakayama | B60R 13/04 | |
| 2012/0200121 A1 * | 8/2012 | Wuerfel | B60R 19/483 | 296/193.09 |
| 2018/0094954 A1 * | 4/2018 | Eberhard | B60R 19/483 | |
| 2018/0297538 A1 * | 10/2018 | Koulas | B60R 11/00 | |
| 2020/0011990 A1 * | 1/2020 | Yu | H01Q 1/42 | |
| 2020/0172020 A1 * | 6/2020 | Nakayama | G01S 13/931 | |
| 2020/0361398 A1 * | 11/2020 | Nakajima | B60R 11/04 | |
| 2021/0031700 A1 * | 2/2021 | Kitagawa | B62D 25/08 | |
| 2023/0070901 A1 * | 3/2023 | Ueda | B60R 19/483 | |
| 2025/0100493 A1 * | 3/2025 | Kwon | B60R 19/483 | |
| 2025/0145100 A1 * | 5/2025 | White | B60R 19/483 | |
| 2025/0153658 A1 * | 5/2025 | Brinkmeier | B62D 25/16 | |
| 2025/0333016 A1 * | 10/2025 | Yagame | B60R 19/483 | |
| 2025/0360888 A1 * | 11/2025 | Ikeno | B60R 19/483 | |

FOREIGN PATENT DOCUMENTS

KR 20180003194 A 1/2018

* cited by examiner

*Primary Examiner* — Gregory A Blankenship
(74) *Attorney, Agent, or Firm* — Slater Matsil, LLP

(57) ABSTRACT

An embodiment bumper structure includes a bracket configured to be fastened to an inner side of a bumper, a radar unit configured to be located in an opening in the bumper and fastened to the bracket, a first molding configured to surround an outer circumference of the radar unit, and a second molding configured to be assembled to the first molding and fastened to the bracket through the first molding and the radar unit.

20 Claims, 4 Drawing Sheets

BUMPER STRUCTURE FOR MOUNTING RADAR UNIT

CROSS-REFERENCE TO RELATED APPLICATIONS

This application claims the benefit of Korean Patent Application No. 10-2023-0129942, filed on Sep. 27, 2023, which application is hereby incorporated herein by reference.

TECHNICAL FIELD

The present disclosure relates to a bumper structure for mounting a radar unit.

BACKGROUND

In recent years, the front part of a vehicle has been equipped with a radar unit for detecting the presence or absence of objects in the forward direction of the vehicle, relative distances between the vehicle and the objects, and the like. Typically, the radar unit is mounted at the rear of a front bumper.

However, when the radar unit is mounted at the rear of the front bumper, the radar unit is disposed near the front bumper to make it easier to detect obstacles in front of the front bumper. Further, the radar unit is rigidly fixed to the vehicle body to improve the object detection accuracy.

However, since the radar unit has high rigidity, there is a problem that if the radar unit is disposed near the front bumper, i.e., if a highly rigid part is disposed immediately behind the front bumper, in the event of a vehicle collision with an object, e.g., a pedestrian, in front of a vehicle, the pedestrian is subject to an increased impact.

Therefore, there is a need to provide a structural design for fastening the radar unit to the front or rear bumper.

Korean Laid-Open Patent Publication No. 10-2018-0003194 may provide information related to the subject matter of the present disclosure.

SUMMARY

The present disclosure relates to a bumper structure for mounting a radar unit. Particular embodiments relate to a bumper structure for mounting a radar unit, wherein the radar unit is mounted in openings symmetrically located on two sides of a bumper.

Embodiments of the present disclosure can solve problems in the art, and an embodiment of the present disclosure provides a bumper structure for mounting a radar unit in which a first molding and a second molding are pre-assembled, and the moldings are subsequently attached to a radar unit to strengthen the fastening force between a bracket located on the inner side of a bumper and the moldings.

Another embodiment of the present disclosure provides a bumper structure for mounting a radar unit, the bumper structure being configured to fasten the radar unit in a direction corresponding to a direction of punching a bumper opening, thereby providing excellent matching performance with an outer surface of a bumper.

The embodiments of the present disclosure are not limited to those mentioned above, and other embodiments of the present disclosure not mentioned may be understood by the following description, and can be seen more clearly by the exemplary embodiments of the present disclosure. Also, the embodiments of the present disclosure may be realized by means and combinations thereof described in the claims.

A bumper structure for mounting a radar unit according to embodiments of the present disclosure described above includes the following configuration.

In an embodiment of the present disclosure, there is provided a bumper structure for mounting a radar unit, the bumper structure including a bracket configured to be fastened to an inner side of a bumper, a radar unit configured to be located in an opening in the bumper and fastened to the bracket, a first molding configured to surround an outer circumference of the radar unit, and a second molding configured to be assembled to the first molding and fastened to the bracket through the first molding and the radar unit.

In some embodiments, the opening in the bumper may be formed by a punching process, wherein the punching direction of the opening is the same as a mounting direction of the radar unit.

In some embodiments, the opening in the bumper formed by the punching process may have a circumferential cutting line, at least a portion of which faces an outer circumference of the radar unit or the first molding.

In some embodiments, the second molding may be configured to be fastened to the bracket after being assembled to the first molding.

In some embodiments, a second hook may be further disposed on the second molding, and a slit may be further disposed in the first molding such that the second hook is inserted into the slit.

In some embodiments, a first hook may be further disposed on a back side of the first molding so as to be interlocked with the bracket.

In some embodiments, the opening in the bumper may be provided in a pair so that two openings are symmetrically located on opposite sides from the middle of the bumper. In some embodiments, the radar unit may further have a radar module configured to monitor a forward situation and an extension member to which the radar module is fastened.

In some embodiments, an extension hole may be formed in the bracket, a fastening hole may be formed in each of the first molding, the extension member, and the second molding, and a fastener may be provided to penetrate through and fixedly fasten the extension hole and the fastening holes.

In some embodiments, the bumper may be either a front bumper or a rear bumper.

In another embodiment of the present disclosure, there is provided a bumper structure for mounting a radar unit, the bumper structure including a bracket configured to be fastened to an inner side of a bumper, a radar unit configured to be located in an opening in the bumper and fastened to the bracket, a first molding configured to surround an outer circumference of the radar unit, and a second molding configured to be assembled to the first molding and fastened to the bracket through the first molding and the radar unit, wherein the radar unit is arranged along a cutting line formed in the opening of the bumper.

In some embodiments, the opening in the bumper may be formed by a punching process, wherein the punching direction of the opening is the same as a mounting direction of the radar unit.

In some embodiments, at least a portion of the cutting line may face an outer circumference of the radar unit or the first molding.

In some embodiments, the second molding may be configured to be fastened to the bracket after being assembled to the first molding.

In some embodiments, a second hook may be further disposed on the second molding, and a slit may be further disposed in the first molding such that the second hook is inserted into the slit.

In some embodiments, a first hook may be further disposed on a back side of the first molding so as to be interlocked with the bracket.

In some embodiments, the opening in the bumper may be provided in a pair so that two openings are symmetrically located on opposite sides from the middle of the bumper.

In some embodiments, the radar unit may further have a radar module configured to monitor a forward situation and an extension member to which the radar module is fastened.

In some embodiments, an extension hole may be formed in the bracket, a fastening hole may be formed in each of the first molding, the extension member, and the second molding, and a fastener may be provided to penetrate through and fixedly fasten the extension hole and the fastening holes.

Embodiments of the present disclosure may achieve the following effects by combinations and use relationships between configurations of the preceding embodiments and configurations to be described in the following.

Embodiments of the present disclosure have the effect of providing a bumper structure for mounting a radar unit with excellent appearance matching performance, thereby providing a sense of aesthetic stability.

In addition, embodiments of the present disclosure have the effect of providing a robust fastening structure for the radar unit, thereby providing a stable sensing environment for the radar unit.

DETAILED DESCRIPTION OF ILLUSTRATIVE EMBODIMENTS

Embodiments of the present disclosure will now be described in more detail with reference to the accompanying drawings. Embodiments of the present disclosure may be modified in various forms, and the scope of the present disclosure should not be construed to be limited to the following embodiments. The present embodiments are provided to more fully illustrate the present disclosure to one of ordinary skill in the art.

In addition, terms such as "... part," "... unit," "... member," and the like used in the specification refer to a unit that performs at least one function or operation, which may be implemented in hardware or software or a combination of hardware and software.

In addition, the terminology used in the specification is used to describe specific embodiments and is not intended to limit the embodiments. Singular expressions include the plural expressions unless the context clearly indicates otherwise.

In addition, in this specification, designations of elements as first, second, and the like are intended to distinguish between them, since the designations of the elements are identical to each other, and are not necessarily limited to that order in the following description.

Hereinafter, embodiments will be described in detail with reference to the accompanying drawings, and in describing the embodiments with reference to the accompanying drawings, identical or corresponding components will be given the same reference number, and duplicate descriptions will be omitted.

Figure 1:
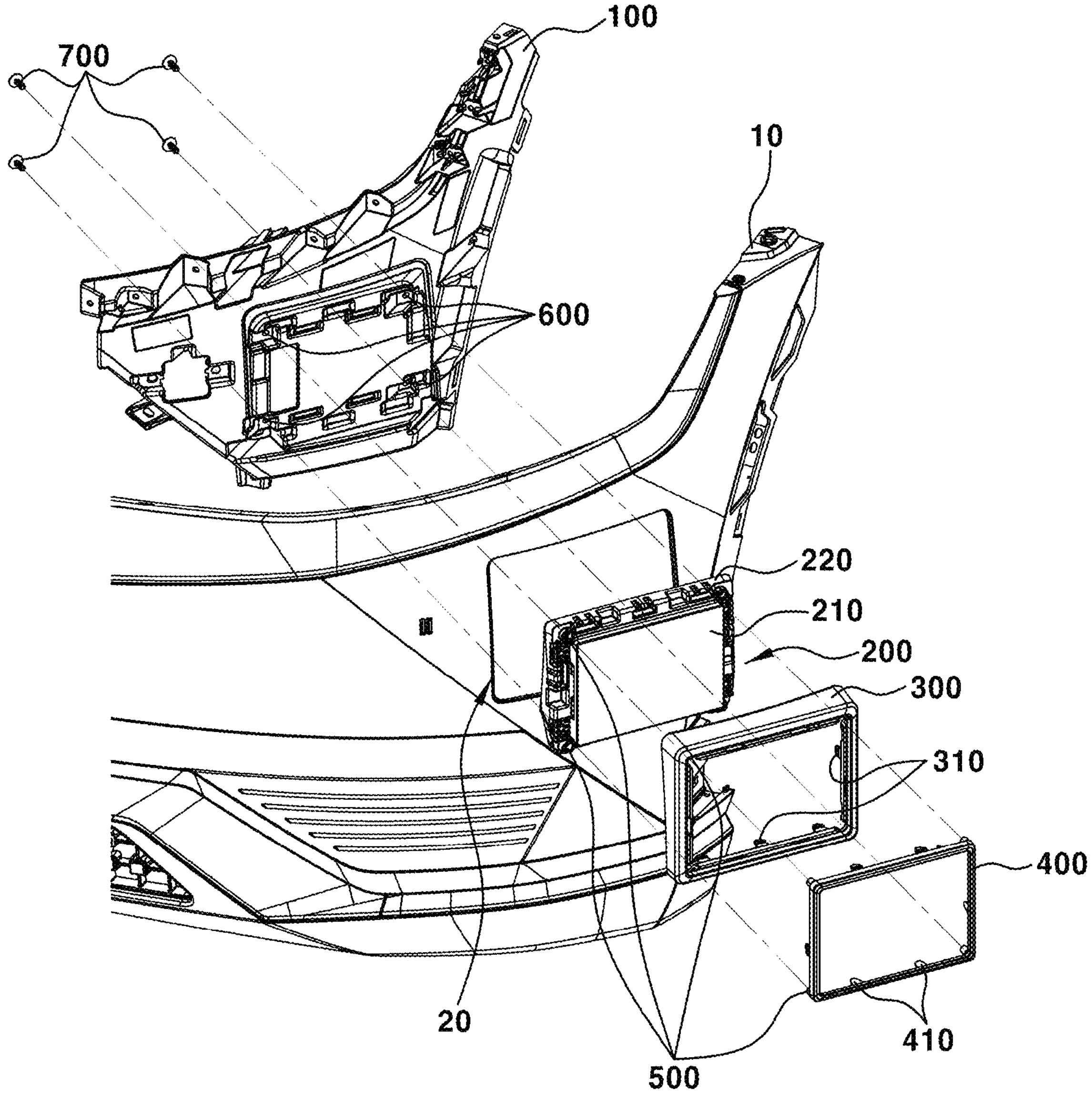
FIG. 1 is a perspective view illustrating a bumper structure for mounting a radar unit, according to an embodiment of the present disclosure.

FIG. 1 is a perspective view illustrating a bumper 10 structure for mounting a radar unit 200, according to an embodiment of the present disclosure.

In an embodiment, the bumper 10 generally includes a front bumper 10 and a rear bumper 10. In the embodiment, the radar unit 200 is illustrated as being located on the front bumper 10.

As illustrated, an embodiment of the present disclosure includes an opening 20 formed in the bumper 10, a bracket 100 disposed on an inner side of the bumper 10, the radar unit 200 disposed in the opening 20 and fastened to the bracket 100, and a first molding 300 and a second molding 400 configured to surround the radar unit 200.

The opening 20 is provided in a pair in the bumper 10 such that two corresponding openings 20 are respectively located on the left and right sides with respect to the middle portion of the bumper 10. Here, the openings 20 may be located in consideration of the measurement range of the radar unit 200.

In an embodiment, the bumper 10 may be constructed by injection molding such that a plurality of closed sections are formed on an inner surface of the bumper 10. This provides a structure for securing a space in a portion of the bumper 10 so as to be crushed during an external impact applied to the bumper 10. Furthermore, while a portion of the bumper 10 is crushed, the closed sections may interact with each other to act as a support to absorb an increased amount of impact applied to the bumper 10.

Furthermore, the bumper 10 may be provided on the inner side with box ribs, which may serve both to prevent shrinkage of a molded surface during injection molding of the bumper 10 and to obtain a uniform injection-molded product. In addition, the curvature of the bumper 10 may be changed depending upon the distances to opposite ends of a vehicle body member to which beams are respectively fastened.

Furthermore, it is advantageous that the box ribs have a withdrawal angle of 1 to 3 degrees for easy detachment of the injection-molded bumper 10. This is because if the withdrawal angle of the box ribs is less than 1 degree, it is difficult to detach the molded product, and if the withdrawal angle of the box ribs is more than 3 degrees, it is advantageous to detach the molded product, but the weight and cost of the molded product increase.

More preferably, after the bumper 10 is injected-molded through the injection process, a punching process may be performed to form the opening 20 in the bumper 10 by applying a predetermined force in a front to rear direction of the bumper 10. The openings 20 may be respectively located in a pair symmetrically on both sides with reference to the middle portion of the bumper 10.

The punching process of the bumper 10 is performed to apply a cutting force in the same direction as the direction in which the radar unit 200 is seated and mounted in the opening 20. In the punching process, a circumferential cutting line 21 is formed in the bumper 10, which is an injection-molded product, such that an outer circumference of the radar unit 200 or the first molding 300 is located around the cutting line 21.

In an embodiment, the radar unit 200 or the first molding 300 configured to surround the radar unit 200 may be configured to match the cutting line 21 formed in the opening 20. Furthermore, the punching direction of the punching process and the mounting direction of the radar unit 200 are configured to match each other.

Figure 2:
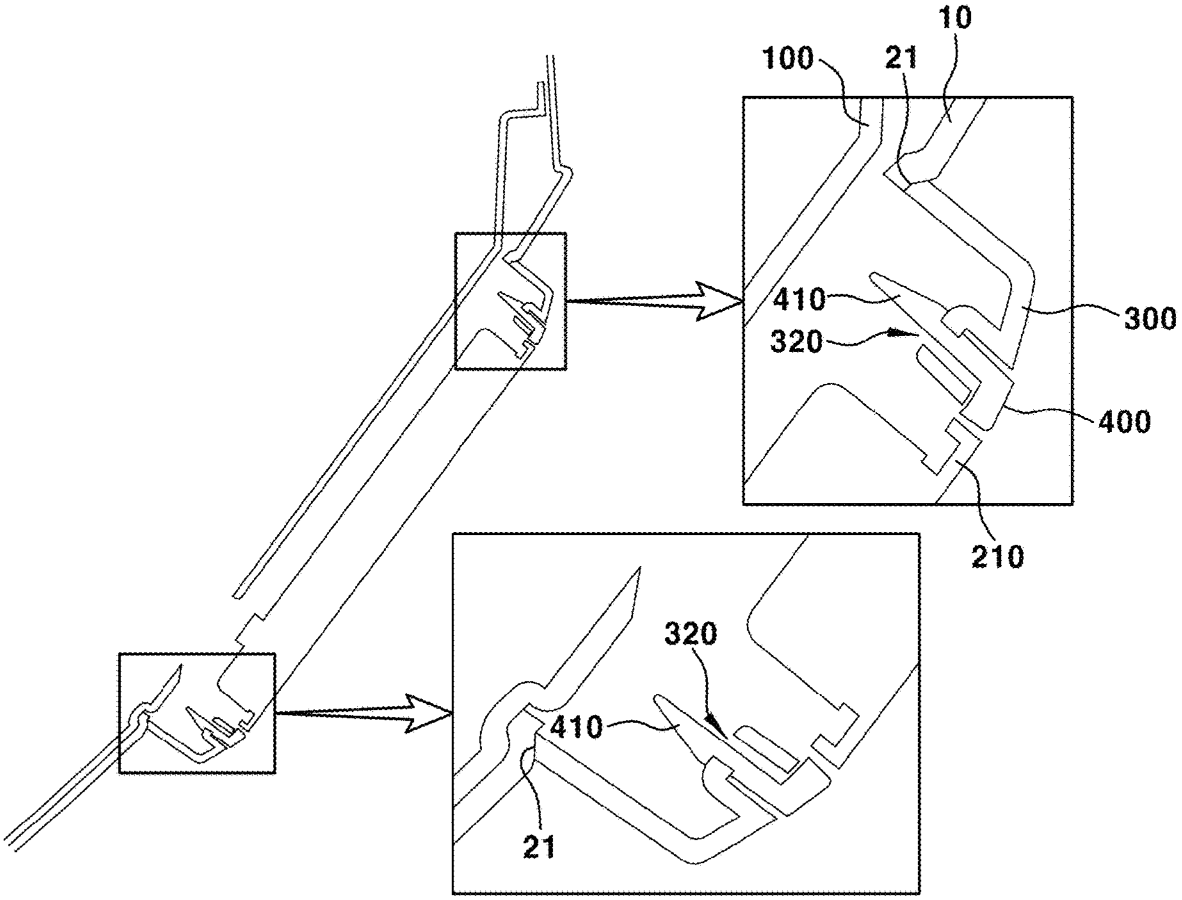
FIG. 2 is a side cross-sectional view illustrating the bumper structure for mounting a radar unit, according to an embodiment of the present disclosure.

FIG. 2 illustrates a side cross-sectional view illustrating the bracket 100, the radar unit 200, the first molding 300, and the second molding 400 being fastened with respect to the bumper 10, according to an embodiment of the present disclosure.

On the inner side of the injection-molded bumper 10, the bracket 100 is located to surround a circumference of the opening 20. Further, the radar unit 200 is located in the opening 20 and includes a first molding 300 configured to surround an outer circumference of the radar unit 200 and a second molding 400 assembled to the first molding 300 and configured to surround the outer circumference of the first molding 300 together with the radar unit 200 surrounded by the first molding 300.

The opening 20 is formed in the bumper 10 in a distal-to-proximal direction of the bumper 10 in the punching process so that the cutting line 21 is formed in the same distal-to-proximal direction of the bumper 10. Furthermore, the first molding 300 configured to surround the radar unit 200 is configured to surround the opening 20 of the bumper 10 along the circumferential cutting line 21.

The radar unit 200 includes a radar and an extension member 220 configured to extend outwardly from the radar.

The extension member 220 includes a mounting hole 221, through which the bracket 100 is fastened and a radar hook 222 located on a back surface of the extension member 220 to engage with the bracket 100. Further, a fastener 800 is provided to engage the bracket 100 and the extension member 220 with each other. In use, the fastener is inserted into the mounting hole 221 through the bracket 100 to engage the bracket 100 and the extension member 220 together.

That is, the radar unit 200 is circumferentially fastened to the bracket 100 via the first molding 300 and directly fastened to the bracket 100 via the extension member 220 of the radar unit 200.

Further, the radar module 210 of the radar unit 200 may include a transmitter antenna element, a receiver antenna element, a communication element, and a controller for controlling the transmitted/received data.

The transmitter antenna element may include a radiator (to be described later), and the radiator is configured to radiate a signal from the transmitter antenna element. That is, the radiator forms a radiation pattern of the transmitter antenna element. Here, the radiator is arranged along a feed line and is made of a conductive material. The conductive material may include at least one of silver (Ag), palladium (Pd), platinum (Pt), copper (Cu), gold (Au), and nickel (Ni).

The transmitter antenna element may include a plurality of transmitter antenna sections having a plurality of antenna arrays. The plurality of transmitter antenna sections are respectively connected to different transmitter channels of the communication element and selectively form a radiation pattern in response to a signal supplied via the communication element.

The receiver antenna element may include a plurality of receiver antenna arrays. In addition, the receiver antenna element may include a radiator, which is configured to form a radiation pattern of the receiver antenna element. Here, the radiator is arranged along a feed line and is made of a conductive material. The conductive material may include at least one of silver (Ag), palladium (Pd), platinum (Pt), copper (Cu), gold (Au), and nickel (Ni).

The communication element is coupled to the plurality of antenna arrays. The communication element may include, for example, a millimeter-wave RFIC. The communication element is configured to generate a transmission signal from transmission data, output the transmission signal to the transmitter antenna element, receive a reception signal from the receiver antenna element, and generate reception data from the reception signal.

The controller may be configured to drive the radar module 210 to detect an object in front of a traveling vehicle. That is, the controller controls the radar module 210 to detect an object present in a surrounding area of a current location of the vehicle. The controller is also configured to process the transmission/reception data transmitted/received via the radar module 210. The controller may be configured to control the communication element to generate a transmission signal from the transmission data. The controller may be configured to control the communication element to generate the reception data from the reception signal. The controller may be configured to synchronize the transmission data with the reception data. The controller may be configured to perform a CFAR operation, a tracking operation, a target selection operation, or the like on the reception data to extract information about an angle, a speed, and a distance of a target.

A fastening hole 500 may be provided in each of the extension member 220, the first molding 300, and the second molding 400, and an extension hole 600 may be provided in the bracket 100. The fastening hole 500 and the extension hole 600 may be integrally secured by a fastener 700. More preferably, the fastener 700 may include a screw bolt. Thus, such fastening device is arranged to enable the radar unit 200 to be fastened to the bumper 10.

Furthermore, the first molding 300 and the second molding 400 may be respectively provided with a second hook 410 and a slit 320 such that the second hook 410 is engaged in the slit 320 to pre-assemble the first and second moldings 300 and 400 together. The pre-assembly of the first and second moldings 300 and 400 may be configured to surround the outer circumference of the radar unit 200 and then be fastened to the bumper 10.

Figure 3:
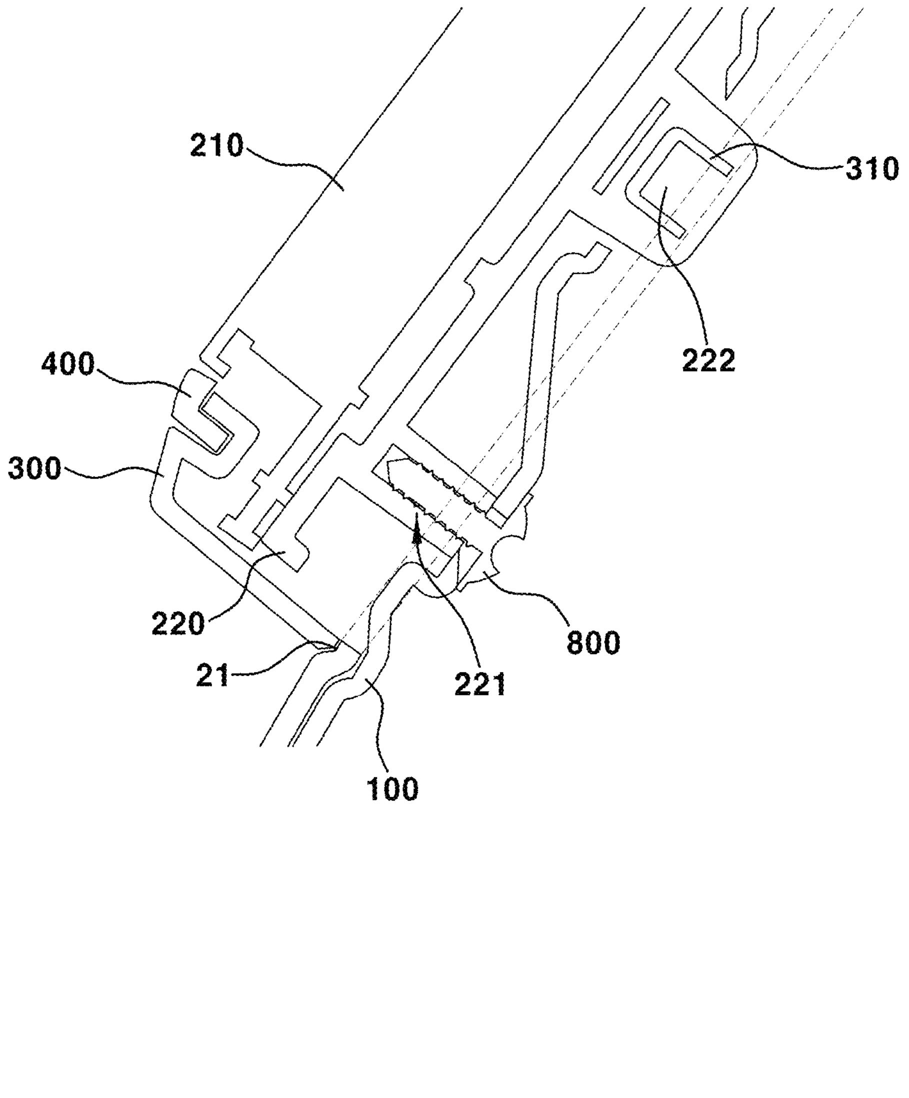
FIG. 3 illustrates a fastening configuration between components of the bumper structure for mounting a radar unit, according to an embodiment of the present disclosure.

FIG. 3 illustrates an engagement relationship between the radar unit 200 and the bracket 100 according to an embodiment of the present disclosure.

As illustrated, the bracket 100 is disposed on the inner side of the bumper 10 and is configured to surround an area larger than the opening 20. The first molding 300 or the extension member 220 is located along the circumferential cutting line 21 of the opening 20, and the radar unit 200 is disposed between the bracket 100 and the first molding 300 in a state of being surrounded by the first molding 300. Further, the second molding 400 is circumferentially assembled to the first molding 300 such that the second hook 410 of the second molding 400 is fixedly inserted into the slit 320 of the first molding 300.

Further, the first molding 300 is provided on the outer circumference with at least one first hook 310 in a direction facing the bracket 100. The first hook 310 is located to penetrate through the extension member 220 of the radar unit 200 and engage with the bracket 100.

Further, the extension hole 600 is provided in the bracket 100, the fastening hole 500 is provided to penetrate through the first molding 300, the extension member 220 of the radar unit 200, and the second molding 400, and the fastener 700 is inserted into and fastened to the second molding through the bracket 100, the first molding 300, and the extension member 220 of the radar unit 200 from the inner side of the bracket 100. More preferably, the fastener 700 may include a screw-mounting member.

Additionally, the second molding 400 is inserted into and assembled to the first molding 300, and the assembly of the first and second moldings 300 and 400 is disposed to circumferentially surround the radar module 210.

The mounting hole 221 of the extension member 220 of the radar unit 200 is provided such that the bracket 100 is fastened therethrough, and the radar hook 222 located on the back surface of the extension member 220 is provided to engage with the bracket 100. Further, the fastener 800 is provided to engage the bracket 100 and the extension member 220 with each other. In use, the fastener 800 is inserted into the mounting hole 221 through the bracket 100 to engage the bracket 100 and the extension member 220 together.

That is, the radar unit 200 is directly fastened to the bracket 100 via the radar hook 222 and the fastener 800, and at the same time, is indirectly fastened to the bracket 100 via the first molding 300, thereby obtaining a double-engagement configuration.

As such, according to embodiments of the present disclosure, in order to provide a bumper 10 assembly structure for mounting sensors, the bumper 10 is injection-molded to have a desired structure, and the opening 20 is formed in the bumper 10 through a punching process. The radar module 210 is then assembled with the extension member 220 and is disposed in the opening 20 of the bumper 10, and a process is performed to fasten the assembly to the bracket 100 located on the inner side of the bumper 10. Then, the first molding 300 and the second molding 400 are assembled, and a process is performed to screw-fasten the assembly to the bracket 100 through the extension member 220 of the radar unit 200.

Figure 4:
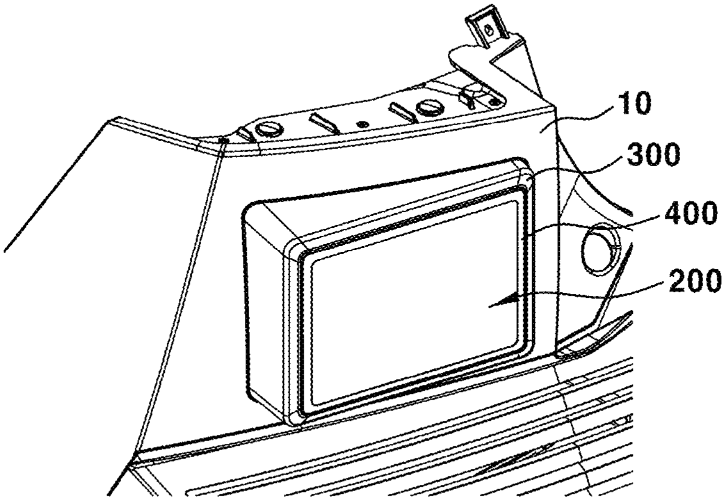
FIG. 4 illustrates a rear bumper having a bumper structure for mounting a radar unit, according to another embodiment of the present disclosure.

FIG. 4 illustrates the configuration of a rear bumper 10 with the radar unit 200 mounted thereon according to another embodiment of the present disclosure.

As illustrated, the radar unit 200 is located in the opening 20 of the rear bumper 10. The radar unit 200 located on the rear bumper 10 includes all of the mounting structures described in FIG. 1.

That is, after the rear bumper 10 is injection-molded, a punching process is performed to form the opening 20. The opening 20 is provided with a circumferential cutting line 21 formed through a punching process, and the radar unit 200 or the first molding 300 is circumferentially disposed in the opening along the cutting line 21.

Furthermore, the first molding 300, which is configured to circumferentially surround the radar unit 200, is pre-assembled to the second molding 400, and then the assembly is fastened to the radar unit 200 and the bracket 100. Here, the fastening holes 500 formed in the extension member 220 of the radar unit 200, the first molding 300, and the second molding 400 are disposed in positions corresponding to the extension hole 600 formed in the bracket 100. Furthermore, the fastener 700 is fastened to at least a portion of the first molding 300 or the second molding 400 through the bracket 100 and the extension member 220, thereby mutually engaging the bracket 100, the extension member 220, and the first molding 300 or the second molding 400.

Thus, embodiments of the present disclosure are configured to measure the driving environment of a vehicle through the radar units 200 located on the front bumper 10 and the rear bumper 10 to optimize a driving condition based thereon.

The above detailed description is illustrative of embodiments of the present disclosure. In addition, the above description shows and describes preferred embodiments of the present disclosure, and the present disclosure may be used in various other combinations, modifications, and environments. That is, changes or modifications are possible within the conceptual scope of the invention disclosed herein, the scope equivalent to the described disclosure, and/or the technical scope or knowledge in the art. The disclosed embodiments illustrate the best mode for implementing the technical idea of the present invention, and various changes required in specific application fields and uses of the present invention are possible. Therefore, the detailed description of the present invention is not intended to limit the present invention to the disclosed embodiments. Also, the appended claims should be construed as including other embodiments.

What is claimed is:

1. A bumper structure comprising:

a bracket configured to be fastened to an inner side of a bumper;

a radar unit configured to be located in an opening in the bumper and fastened to the bracket, the radar unit comprising an extension member that is directly coupled to the bracket;

a first molding configured to surround an outer circumference of the radar unit; and a second molding configured to be assembled to the first molding and fastened to the bracket through the first molding and the radar unit so that the extension member is coupled to the bracket via the first and second moldings.

2. The bumper structure of claim 1, wherein the opening in the bumper is punched through the bumper, and wherein a punching direction of the opening is a same direction as a mounting direction of the radar unit.

3. The bumper structure of claim 2, wherein the opening in the bumper has a circumferential cutting line, at least a portion of which faces the outer circumference of the radar unit or an outer circumference of the first molding.

4. The bumper structure of claim 1, wherein the second molding is configured to be fastened to the bracket after being assembled to the first molding.

5. The bumper structure of claim 4, further comprising:

a second hook disposed on the second molding; and a slit disposed in the first molding, wherein the second hook is configured to be inserted into the slit.

6. The bumper structure of claim 1, wherein the opening in the bumper comprises a pair of openings, the pair of openings being symmetrically located on opposite sides from a middle of the bumper.

7. The bumper structure of claim 1, wherein the radar unit further comprises a radar module configured to monitor a forward situation; and wherein the extension member comprises:

a radar hook configured to allow the extension member to be fastened to the bracket; and a mounting hole disposed on an inner side of the extension member such that a first fastener is fastenable thereto through the bracket.

8. The bumper structure of claim 7, further comprising:

an extension hole disposed in the bracket;

fastening holes respectively disposed in each of the first molding, the extension member, and the second molding; and second fasteners configured to penetrate through and fixedly fasten the extension hole and the fastening holes.

9. The bumper structure of claim 1, wherein the bumper is either a front bumper or a rear bumper of a vehicle.

10. A bumper structure comprising:

a bracket configured to be fastened to an inner side of a bumper;

a radar unit configured to be located in an opening in the bumper and fastened to the bracket;

a first molding configured to surround an outer circumference of the radar unit; and a second molding configured to be assembled to the first molding and fastened to the bracket through the first molding and the radar unit; and a first hook disposed on a back side of the first molding and configured to be interlocked with the bracket.

11. A bumper structure comprising:

a bracket configured to be fastened to an inner side of a bumper;

a radar unit configured to be located in an opening in the bumper and fastened to the bracket, the radar unit comprising an extension member that is directly coupled to the bracket;

a first molding configured to surround an outer circumference of the radar unit; and a second molding configured to be assembled to the first molding and fastened to the bracket through the first molding and the radar unit so that the extension member is coupled to the bracket via the first and second moldings, wherein the radar unit is arranged along a cutting line disposed in the opening of the bumper.

12. The bumper structure of claim 11, wherein the opening in the bumper is punched through the bumper, and wherein a punching direction of the opening is a same direction as a mounting direction of the radar unit.

13. The bumper structure of claim 12, wherein at least a portion of the cutting line faces the outer circumference of the radar unit or an outer circumference of the first molding.

14. The bumper structure of claim 11, further comprising a first hook disposed on a back side of the first molding and configured to be interlocked with the bracket.

15. The bumper structure of claim 11, wherein the second molding is configured to be fastened to the bracket after being assembled to the first molding.

16. The bumper structure of claim 15, further comprising:

a second hook disposed on the second molding; and a slit disposed in the first molding, wherein the second hook is configured to be inserted into the slit.

17. The bumper structure of claim 11, wherein the opening in the bumper comprises a pair of openings, the pair of openings being symmetrically located on opposite sides from a middle of the bumper.

18. The bumper structure of claim 11, wherein the radar unit further comprises a radar module configured to monitor a forward situation; and wherein the extension member comprises:

a radar hook configured to allow the extension member to be fastened to the bracket; and a mounting hole disposed on an inner side of the extension member such that a first fastener is fastenable thereto through the bracket.

19. The bumper structure of claim 18, further comprising:

an extension hole disposed in the bracket;

fastening holes respectively disposed in each of the first molding, the extension member, and the second molding; and second fasteners configured to penetrate through and fixedly fasten the extension hole and the fastening holes.

20. The bumper structure of claim 11, wherein the bumper is either a front bumper or a rear bumper of a vehicle.

* * * * *